Feb. 3, 1959   J. N. FITZGERALD ET AL   2,872,043
WATER SEPARATORS
Filed June 6, 1956   2 Sheets-Sheet 2
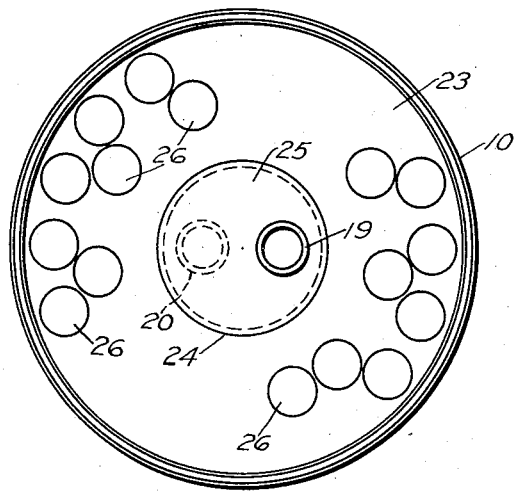
FIG. 3
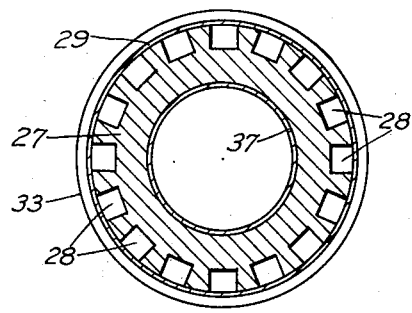
FIG. 5
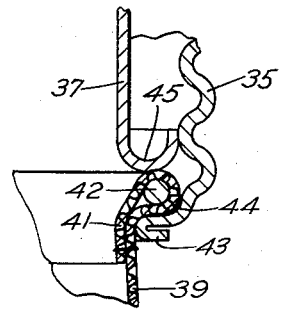
FIG. 6
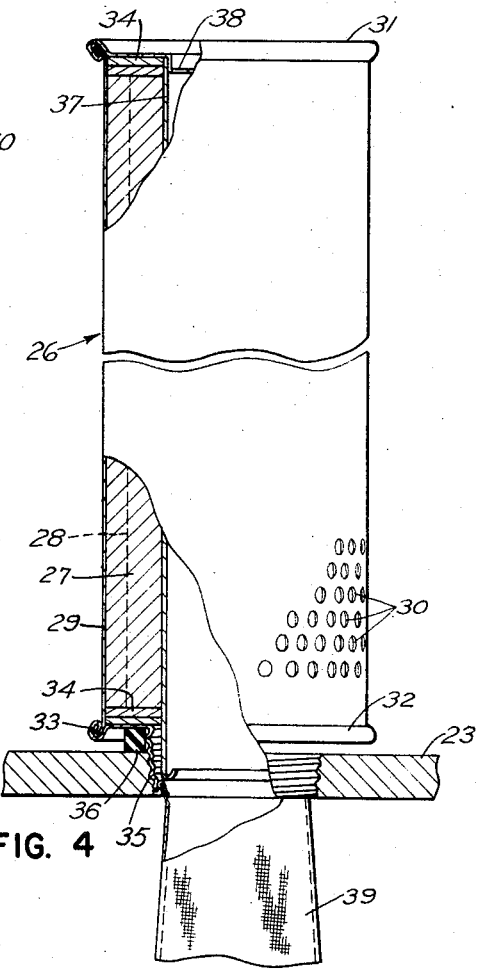
FIG. 4
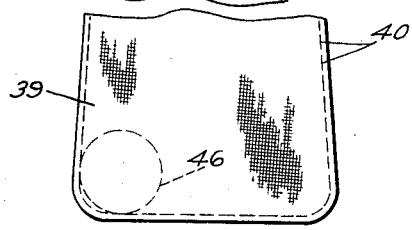
JOSEPH N. FITZGERALD
JOHN W. GERNHARDT
OWEN C. REDMON
INVENTORS.
BY Charles C. Willson
ATTORNEY

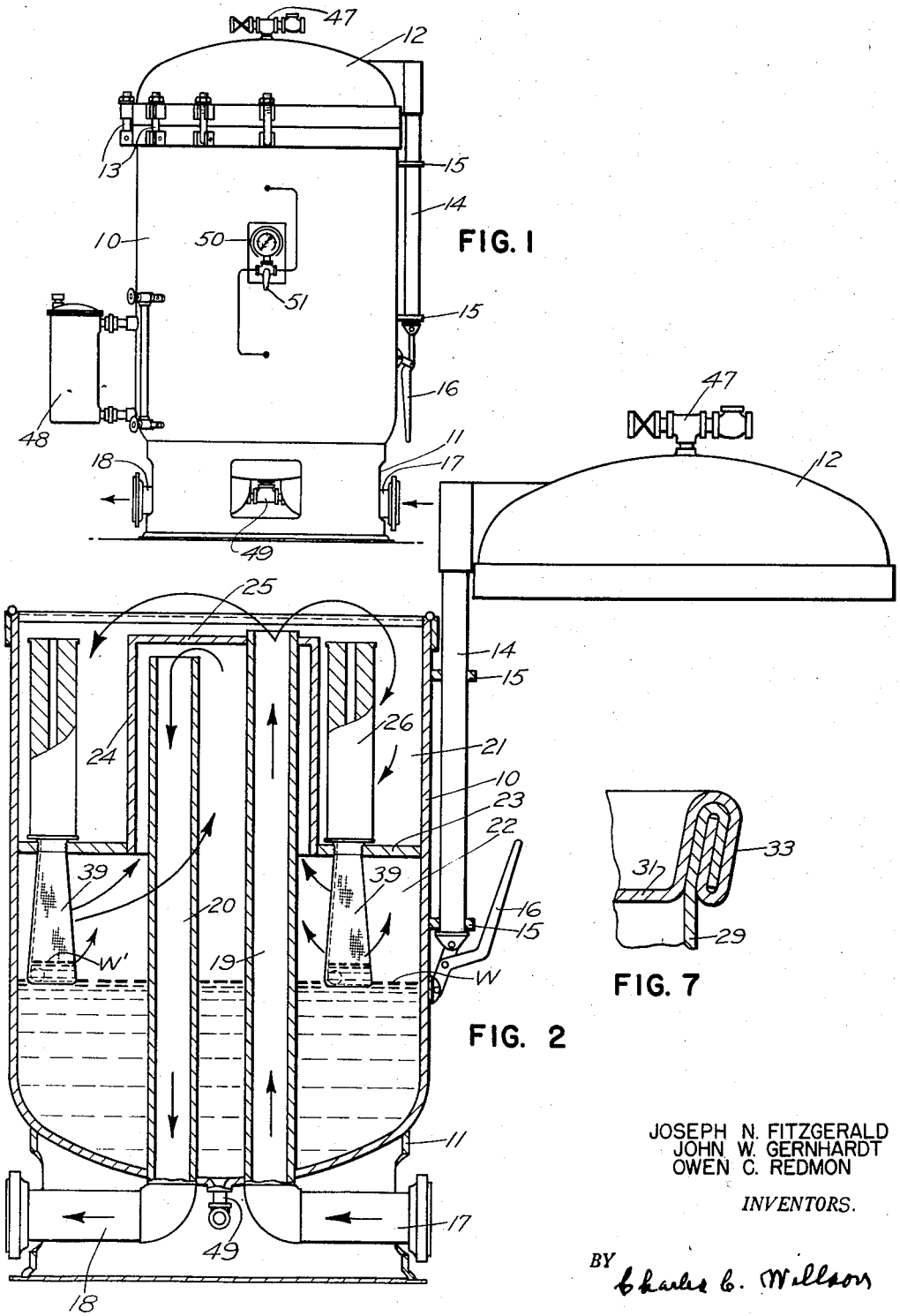

2,872,043
WATER SEPARATORS

Joseph N. Fitzgerald, John W. Gernhardt, and Owen C. Redmon, Tulsa, Okla., assignors to Fram Corporation, East Providence, R. I., a corporation of Rhode Island Application June 6, 1956, Serial No. 589,710

8 Claims. (Cl. 210—307)

This invention relates to liquid separators, and more particularly to liquid separators for removing entrained water from a large volume of liquid such as hydrocarbon. The present application is a continuation-in-part of our prior application Serial No. 516,624, filed June 20, 1955.

It is frequently desirable to make sure that a hydrocarbon liquid such as gasoline, jet fuel, or lubricating oil is free of water. It is well known that when a liquid is contained in an unsealed container, water from the atmosphere may condense upon the inner walls of the container, and in this manner, or by other means, find its way into the liquid.

When the presence of even a small amount of water in a hydrocarbon liquid is highly objectionable, it may be desirable to pass the hydrocarbon carrying the entrained water through a combined filter and separator to free the hydrocarbon from dirt and water.

Liquid separators for this purpose have been used heretofore, and usually employ a two-stage separation. They frequently comprise a relatively large tank or container having therein a number of coalescer units that filter the liquid and cause the finely dispersed particles of water to coalesce or form droplets of appreciable size, and these separators also employ as a second-stage treatment, separator units which will pass the hydrocarbon but block the water droplets, up to a critical pressure.

The present invention relates to a two-stage separator of the general type just described, and more particularly to improvements in the coalescer unit and in the separator unit, whereby a reduction in the cost of producing a liquid separator that will remove all water at a high flow rate is secured.

One important feature of the present invention resides in the construction of the coalescer which may be formed primarly of an inexpensive tube of fiber glass such as is now sold commercially in large quantities as pipe insulating material. We have found that these fiber glass tubes do a good coalescing job but dirt, which may be present in the liquids being treated, has a tendency to clog the surface of the tube and cause an excessive rise in the differential pressure across the cartridges. We have further found that this difficulty can be overcome by cutting a number of slots longitudinally in the surface of the fiber glass tube so as to increase the surface area exposed to the oil. Also, as the oil passes through the fiber glass tube, it will take the course of least resistance and pass first through the bottom of the slots, until these slots are clogged with dirt, and then penetrate through the unslotted outer walls. In this way the filtering and coalescing life of such fiber glass tubes is greatly increased.

Another important feature of the present invention resides in the separator units employed to remove the coalesced particles of water from the hydrocarbon stream. To this end the separator of the present invention is provided with an upper high pressure chamber in which the coalescers, such as above described, are installed, and below such high pressure chamber is provided a chamber of lower pressure. After the liquid to be treated has passed through the coalescers, it is delivered into sacks or socks that extend downwardly from the coalescers into the lower chamber. These sacks operate to pass the hydrocarbon liquid but block the particles of water.

These sacks or socks form an important part of the present invention. They may be formed of a thin closely constructed textile fabric so that the interstices of the fabric are small enough to block the particles of coalesced water, but will pass the hydrocarbon liquid. The yarn used in this fabric should not swell appreciably in either liquid present in the separator. Furthermore, the fabric should not have a wicking action with respect to the water, and it should wet more readily with the hydrocarbon than with water. In operation, the hydrocarbon carrying the coalesced water droplets passes from the coalescers into the sacks, and then the hydrocarbon passes outwardly through the walls of the sack. The coalesced water particles are blocked by the fabric and they run down the inside walls of the sack to collect in the lower end of the sack until a certain level is reached. The accumulating water in the sack will ultimately provide the desired unblocking pressure that will enable the water to pass through the sack membrane into the lower portion of the tank. When this happens, the hydrocarbon will replace the discharged water, and this will restore the water repellent properties of the lower portion of the sack.

Still another feature of the invention resides in the construction whereby the outlet for the treated hydrocarbon is located in a dome well above the sacks and at a substantial distance from the sacks, so that gravity will assist in removing any remaining particles of water from the stream of hydrocarbon flowing towards such outlet.

The above and other features of the present invention will be further understood from the following description when read in connection with the accompanying drawings; wherein, Fig. 1 is a side elevation of a vertical liquid separator embodying the features of the present invention.

Fig. 2 is a vertical sectional view through the liquid separator of Fig. 1, the cover being shown in the open position.

Fig. 3 is a top plan view of the separator of Fig. 2 looking into the upper chamber.

Fig. 4, on a larger scale, is a side elevation with parts in section of a coalescer cartridge and separator sack as contemplated by the present invention.

Fig. 5 is a transverse sectional view through the coalescer cartridge of Fig. 4.

Fig. 6, on a larger scale, is a vertical sectional view of the upper end portion of the sack and supporting means thereof, and Fig. 7 is a vertical sectional view through the upper end portion of the shell for the coalescer cartridge, showing how the end is secured to the side wall.

Referring to the liquid separator as illustrated in Figs. 1 and 2 of the drawing, 10 designates a vertical cylindrical tank or shell in which the separation of the liquids, such as water, and a hydrocarbon liquid is effected. This separator is constructed to withstand a relatively high internal pressure. The tank 10 is therefore formed of comparatively heavy metal and is shown as resting upon a supporting base 11. At the upper end of the tank 10 is provided the removable cover 12 which is tightly clamped to the upper end of the tank by a number of bolts 13. A sealing gasket is provided between the upper end of the tank and its cover. It is desirable to remove the cover 12, from time to time, in order to secure access to the interior of the tank to service the coalescers and in the construction shown, the cover is pivotally mounted upon the upper end of a supporting shaft 14 which is slidably mounted in the brackets 15 that are rigidly secured to a side wall of the tank. The arrangement is such that when it is desired to remove the cover, it can be raised from its tank-closing position, after the clamping bolts 13 have been released, and then swung in a horizontal plane about the shaft 14 to the open position in which it is shown in Fig. 2. The cover is readily raised out of engagement with the tank by operating the toggle lever 16 which is adapted to raise or lower the shaft 14.

In the construction shown, the inlet pipe 17 for supplying the liquids to be separated, and the outlet pipe 18 for removing the hydrocarbon liquid from the tank are mounted in the supporting base 11. The pipe 17 is shown in Fig. 2 as having the riser 19 extending upwardly within a central portion of the tank 10, and the pipe 18 has the riser 20 within such tank. This arrangement of the risers 19—20 within the tank conserves space, and makes it easier to connect the inlet pipe 17 and outlet pipe 18 to the required pipe fittings. The pipes just mentioned are shown as relatively large because the separator of the present invention is designed to separate liquids at high speed. For example, the tank 10, if given an inside diameter of thirty-six inches, is capable of operating at an internal pressure of 150 p. s. i., and at a flow rate through the tank of several hundred gallons per minute when operating upon jet fuel. At this rate the jet fuel will be filtered free of dirt and will have practically all traces of water removed therefrom.

The tank 10, as shown, is divided into an upper high pressure chamber 21 and a lower chamber 22 where the operating pressure is somewhat lower. These two chambers are separated, one from the other, by a horizontally extending partition 23 and the central portion of this partition, in the construction shown, has the upwardly extending dome 24. The upper end of this dome is closed by the end plate 25. The dome 24 is shown as extending upwardly almost to the upper end of the tank 10, and it provides a collecting chamber in which the hydrocarbon liquid that is freed of dirt and water collects to enter the upper end of the outlet pipe 18, 20. The inlet pipe 19 extends upwardly through the end cover 25 of the dome and serves to deliver its liquid into the upper high pressure chamber 21.

In the construction shown, coalescer cartridges 26 are provided in the upper chamber 21 and serve to filter out the dirt in the liquid and to coalesce the minutely dispersed particles of water in such liquid. The hydrocarbon with the coalesced water therein passes inwardly through the walls of the cartridge to the central passage thereof and then downwardly through holes in the partition 23 into the lower chamber 22. The present liquid separator, if given an inside diameter of thirty-six inches, will have room for thirty-six coalescers 26. These coalescers, as shown in Fig. 3, are arranged so that eighteen are disposed in an inner circle and eighteen are disposed in an outer circle. Each coalescer is provided at its lower end with threaded means, to be described, and the partition 23 has formed therein thirty-six threaded holes adapted to have the coalescers screwed therein as shown in Fig. 4. The arrangement is such that the liquid to be treated fills the upper high pressure chamber 21 and passes inwardly through the walls of the coalescers 26 and then downwardly in the central portion of each coalescer to be discharged at the lower end of the coalescer into the lower chamber 22.

Since a large number of coalescers are employed in the present liquid separator, it is important that the cost of each coalescer be kept as low as is practical and still do an effective job. It is found that low cost coalescers can be provided by forming the coalescer element of a fiber glass tube 27, such as has been extensively used heretofore, as the insulating covering for steam pipes and cold storage pipes. All that is necessary is to cut such fiber glass tubes to the desired length and then place them in a protective casing to be described. It is found, however, that dirt within the stream of liquids being treated tends to deposit on the outer surface of the fiber glass tube, and will gradually clog such surface. It is further found that this clogging can be reduced and the filtering and coalescing life of the fiber glass elements can be materially increased by cutting longitudinal grooves 28 in the outer surface of the tube, as shown in Fig. 5. These grooves serve to increase the area of the tube on which dirt may lodge. Where the thickness of the fiber glass tube is reduced by these grooves, the liquid being separated can pass more readily through the bottom of these grooves than through the thicker non-slotted portions of the tube. As a result, dirt will deposit more rapidly in the bottom of such grooves, and as these grooves fill up the liquid may still pass through the unslotted portion of the tube. It will therefore be seen that the filtering and coalescing life of these cartridges is materially increased by the grooves 28.

In order to protect these fiber glass tubes when they are being handled, and when in use in a liquid separator, they are preferably enclosed in a cylindrical metal wall 29 which is provided with numerous perforations 30 as shown in Fig. 4. The upper end of this wall is closed by a metal cap 31. The lower end of such wall is provided with a somewhat similar cap 32. These caps may be strongly secured to the ends of such wall 29 by a rolled seam such as indicated by 33 and which is best shown in Fig. 7. In order to prevent any liquid from passing around the ends of the fiber glass tube 27 between such tube and the plates 31 or 32, one or more fiber glass rings 34 may be provided at each end of the fiber glass tube 27.

The lower end plate 32 as shown, has a downwardly extending integral portion or sleeve 35 which is threaded as shown in Figs. 4 and 6 and this threaded portion can be screwed into a corresponding threaded hole formed in the partition 23. The construction is such that the coalescer cartridges 26 can be secured in their operating position in the liquid separator by rotating such cartridge to screw its lower end into a threaded hole in the partition 23. In order to provide a tight seal between the lower end of a cartridge and the partition 23, a rubber gasket 36 is preferably provided in surrounding relation with the threaded portion 35, so that this gasket will be compressed as the lower end of the coalescer is screwed home in a hole in the partition 23. To internally reinforce the fiber glass tube 27, a perforated center core 37 is provided. The upper end of this core snugly embraces a depressed cupped portion 38 formed in the upper plate 31, and the lower end of this center core extends downwardly well into the threaded tubular portion 35 for a purpose to be described.

The flow through the coalescers 26 is, as above stated, in an outside-in direction and after the liquid has passed through the walls of the fiber glass tube 28, it passes downwardly inside of the perforated core 37 to be discharged into the lower chamber through the threaded lower portion 35 of such cartridge. The coalescer cartridges 26 serve to coalesce the minute particles of water into droplets which can be removed from the stream of hydrocarbon by the very simple separating means now to be described.

Each coalescer cartridge, in accordance with the present invention, has suspended from the lower end thereof a sock or sack of fine textile material such, for example, as a fine woven fabric preferably formed of synthetic yarns such as nylon, and which fabric will serve to pass the hydrocarbon liquid but block the coalesced particles of water in the hydrocarbon stream. The fine closely constructed fabric may be woven, knitted, or otherwise formed, but it is preferably formed of a fine woven fabric having approximately 100 warps and 100 wefts to the inch. The fabric is easily converted into a sack such as indicated by 39 by sewing a seam along the bottom and one side wall as indicated by 40 in Fig. 4. The upper end of this sack 39 is provided with a hem as indicated by 41 and in this hem is confined a metal ring 42 which ring has a diameter that will cause the hem in which it is confined to rest upon an annular flange 43 provided at the lower end of the threaded tubular portion of the coalescer, as best shown in Fig. 6. To prevent any leakage around this hem 41, a small amount of adhesive such as indicated by 44 may be provided between the hem and the supporting means 43 for the same, and the center core 37 as above stated, extends downwardly well into the threaded portion 35. The lower end of this center core has the rounded portion 45 which rests firmly on the upper portion of the hem as shown in Fig. 6. This center core is of such length that the pressure exerted upon its upper end by the cap 31 holds its beaded lower portions 45 in firm contact with the hem 41 of the sack to prevent liquid from passing around such hem and entering the sack. It is desirable that the sacks hang downwardly in a vertical position when in operation so that they do not contact one another and to this end each sack may be provided with a weight which will keep it in a vertical position. It is found that a glass marble such as indicated by 46 confined within a sack makes a very satisfactory weight. The construction just described is such that no sharp metal part contacts the sack.

Having described most of the construction shown, the operation of the liquid separator forming the subject matter of the present invention will now be described.

When this liquid separator is first put into operation, some air may be trapped in the upper portion of the tank. This air can be drawn off through valve means 47 provided in the cover 12. During the normal operation of this liquid separator, a substantial amount of water will be contained in the lower portion of the tank as indicated by W, and the level of this water is preferably maintained by automatic control means at about the bottom of the sacks 39 as shown in Fig. 2. The level of such liquid may be controlled by automatic valve means confined within the housing 48. Such control means may effect the discharge of water from time to time through the outlet pipe 49 at the bottom of the tank 10. It is important that the sacks 39 be formed of water repellent material which will pass the hydrocarbon liquid but block the particles of water up to a critical pressure, which may be referred to as the unblocking pressure. The operation is such that as the hydrocarbon liquid flows into the sacks 39, it will escape through the side walls of the sack whereas, the particles of water will be blocked by the fabric and will move downwardly along the inner walls of the sack to accumulate in the bottom portion of the sack as indicated by W' in Fig. 2 of the drawing. This water will build up in the bottom of the sack until an unblocking pressure is reached, whereupon the water will pass through the interstices of the sack into the water pool W. As this happens, the hydrocarbon liquid resting upon the water W' will replace the removed water and this will restore the water repellent properties of the sack. As soon as this happens, the water will again start to accumulate in the lower portion of the sack.

It will be seen from the foregoing that these sacks are simple in construction and may be provided at low cost. It will also be seen that these sacks operate automatically to discharge the water W' therefrom each time such water rises sufficiently to produce an unblocking pressure within the sack. The present separator is compact in construction and operates in a highly satisfactory manner to free a hydrocarbon liquid from dirt and entrain water at a high rate of flow such, for example, as several hundred gallons per minute of jet fuel in a separator tank having the internal diameter above mentioned. The cartridge 26 is preferably shipped with the sack 39 tucked inside of the center tube 37 where it is out of the way, and it may remain in this position while the cartridge is screwed to the partition 23.

When the liquid separator of the present invention is in operation, it is important to determine, from time to time, the pressure within the upper chamber 21 and lower chamber 22 and to make sure that the differential in pressure between these two chambers is not unduly high. The pressure in either chamber can be easily determined by the pressure gauge indicated by 50 in Fig. 1, and which is provided with a hand valve 51 which may be shifted to take a reading in either the upper chamber or the lower chamber as desired.

Having thus described our invention, what we claim and desire to protect by Letters Patent is:

1. A separator for removing water from a hydrocarbon liquid, comprising an upright tank having a partition therein that divides the tank into an upper high pressure chamber and a lower chamber of less pressure, a removable cover that provides access to the first chamber, an inlet for the first chamber and an outlet for the second chamber, coalescer cartridges of the outside-in flow type mounted in the first chamber on said partition and each having a sleeve at its lower end that projects downwardly through an opening in such partition, and a sack formed of a fine closely constructed fabric extending downwardly from each sleeve into the lower chamber and operable to receive the coalesced stream from the interior of the cartridge and to pass the hydrocarbon liquid but block the coalesced water up to a critical pressure.

2. A liquid separator substantially as in claim 1 wherein the sleeve is threaded for threaded engagement with the partition.

3. A liquid separator substantially as in claim 1, wherein the fabric is formed of synthetic yarns.

4. A liquid separator substantially as in claim 1, wherein the sack is formed of fine yarns woven with approximately 100 warps and 100 wefts to the inch.

5. A liquid separator substantially as in claim 1, wherein a weight is provided in the sacks that causes them to hang downwardly from said cartridges.

6. A liquid separator substantially as in claim 1, wherein each sack will retain water therein until its weight reaches the critical pressure whereupon the water will pass through the interstices of the fabric to empty the sack.

7. A liquid separator substantially as in claim 1, wherein the inlet and outlet each comprises a pipe that extends upwardly high within the central portion of the tank.

8. A liquid separator substantially as in claim 1, wherein each sack has a rigid ring at its upper end that fits in the sleeve to support the sack.

References Cited in the file of this patent

UNITED STATES PATENTS

| | | |
|---|---|---|
| 2,556,722 | Hersberger | June 12, 1951 |
| 2,609,932 | Fricke | Sept. 9, 1952 |
| 2,725,986 | Marvel | Dec. 6, 1955 |
| 2,800,232 | Marvel | July 23, 1957 |